INVENTOR.
R. B. HANER
BY Forest B. Hitchcock
HIS ATTORNEY

Sept. 24, 1968 R. B. HANER 3,403,381

SYSTEM FOR RADIO COMMUNICATION BY ASYNCHRONOUS TRANSMISSION OF PULSES CONTAINING ADDRESS INFORMATION AND COMMAND INFORMATION

Filed Feb. 5, 1965 4 Sheets-Sheet 2

INVENTOR.
R.B.HANER

BY Forest B. Hitchcock

HIS ATTORNEY

SYSTEM FOR RADIO COMMUNICATION BY ASYNCHRONOUS TRANSMISSION OF PULSES CONTAINING ADDRESS INFORMATION AND COMMAND INFORMATION

Filed Feb. 5, 1965

INVENTOR
R. B. HANER
BY Forest B. Hitchcock
HIS ATTORNEY

Sept. 24, 1968 R. B. HANER 3,403,381

SYSTEM FOR RADIO COMMUNICATION BY ASYNCHRONOUS TRANSMISSION OF PULSES CONTAINING ADDRESS INFORMATION AND COMMAND INFORMATION

Filed Feb. 5, 1965 4 Sheets-Sheet 4

INVENTOR.
R. B. HANER
BY Forest B. Hitchcock
HIS ATTORNEY

United States Patent Office 3,403,381
Patented Sept. 24, 1968

3,403,381

SYSTEM FOR RADIO COMMUNICATION BY ASYNCHRONOUS TRANSMISSION OF PULSES CONTAINING ADDRESS INFORMATION AND COMMAND INFORMATION

Robert B. Haner, Scottsville, N.Y., assignor to General Signal Corporation, Rochester, N.Y., a corporation of New York Filed Feb. 5, 1965, Ser. No. 430,673
11 Claims. (Cl. 340—171)

ABSTRACT OF THE DISCLOSURE

A communication system having a plurality of paired transmitters and receivers in which each transmitter sends a carrier frequency modulated by command and address signals, the command signal being sent at a short interval after the address signal. A receiver demodulates the address and command signals and applies them through gating circuitry to utilization apparatus. The gating circuitry only permits application of the command signals to the utilization apparatus upon recognition of address signals associated with a particular transmitter.

This invention relates to radio communication systems, and more particularly to an improved method and apparatus for accommodating a large plurality of communicated messages on a single carrier frequency with a minimum of interference between messages contemporaneously transmitted from each of a plurality of transmitters to respective individual receivers.

In many present-day industrial and transit operations, use of remote control can greatly speed production, or decrease costs for the same production. Use of radio to provide a communication link between the operator and controlled apparatus allows great flexibility of remotely controlled operation. Moreover, most industrial and transit operations require many operators for separately controlling many pieces of apparatus. Thus, a system for permitting control of such plurality of operations by radio can have wide utility, since use of radio frees the controlled apparatus from the necessity of direct electrical contact with the transmitter. However, because the radio spectrum is highly utilized throughout the world, the necessary plurality of frequencies required for such operations can rarely be allocated to a single user.

In a system described in J. D. Hughson et al., U.S. patent application Ser. No. 270,751, filed Apr. 4, 1963, a single frequency is utilized for communications between a plurality of transmitter-receiver combinations, each transmitter-receiver combination sharing time with the other transmitter-receiver combinations in a multiplexing arrangement. In the Hughson et al. system, any particular transmitter is on the air for but a fraction of a second; for example, approximately 0.1 second in each second. This leaves the remaining time in each second, approximately 0.9 second, for other transmissions to occur without interference from the first transmitter. The individual transmitters are not in any way connected, and therefore are unsynchonized, unlike conventional multiplex systems.

In an unsynchronized multiplex system, if two transmitters should be simultaneously transmitting to their respective receivers, and proximity between transmitters and receivers is such as to cause interference, each receiver must reject the information received in order to avoid an erroneous operation. Such occurrence is minimized in the Hughson et al. system by making the pulse repetition rate of each transmitter random in time. Moreover, to provide essentially continuous communication, each pulse produced by any given transmitter occurs within specified time limits from the preceding pulse produced by the given transmitter; for example, between 0.5 and 1.5 seconds following the preceding pulse.

Because each receiving station must respond to only one transmitter, it is necessary to provide an address so that each receiving station can recognize any message sent from its associated transmitter. In the aforementioned Hughson et al. system, the address is composed of a group of modulating frequencies superimposed on the carrier frequency.

For fail-safe operation, a lack of communication, as well as an improper or jumbled message, must be interpreted as a stop command. However, although fail-safety would exist under such circumstances, the frequent interruption of work which would result from a stop command being produced each time a jumbled or improper message were received would render use of a radio remote control system impractical. To alleviate this problem, the Hughson et al. system requires a specified duration of either improper communications or loss of communications before providing a stop command. If, for example, two consecutive pulses are not received or are received with improper or jumbled information carried thereon, a stop command is produced. However, random time spacing of the pulses makes it extremely rare that two consecutive pulses from a single transmitter would be interfered with.

In the Hughson et al. system, each radio reception is checked to ascertain that all required address frequencies are present, and that no other address frequencies are present. In addition to containing the proper address frequencies, each transmitted message also comprises a specific number of command frequencies. If the receiving system detects the proper address and a proper command, it then opens an AND gate, allowing the system to check on the modulating frequencies comprising the command signal. If the proper number of command frequencies and their combinations are present in accordance with certain conditions as determined by the system, the overall command is accepted as legitimate. However, if the number of command frequencies is not proper, or if there are improper combinations of command frequencies, the command is rejected. The command frequencies are used for controlling the remotely operated equipment at the receiving station.

Although the Hughson et al. system works well with a large number of receiver-transmitter combinations operating on a single carrier frequency, it has been found that a further substantial increase in this number of receiver-transmitter combinations operating on this frequency produces some interference. This interference arises because many pulses on the same carrier frequency are being produced by the various transmitters. The address frequencies received at any receiving station, if improper, deactuate a plurality of gates in the receiver system, preventing improper operation. However, regardless of whether these gates comprise relays or electronic circuits, a finite time is required for these components to become nonconductive. During this finite deenergization time, there exists a possibility that an improper command signal may reach the controlled equipment through the still-conducting gates. To obviate this condition, the present invention improves upon the Hughson et al. system by delaying transmission of the command frequencies for a sufficient time after start of a radio transmission to permit the receiver gates to become nonconductive in the event an improper communication is received by the receiving system. This delay may be on the order of 10 milliseconds after start of the radio transmission. Elimination of the possibility of false commands due to the required time for the receiver gates to become nonconductive thereby permits an increased number of transmitter-receiver combinations to be operated on a single carrier frequency with substantially no interference.

Accordingly, one object of the invention is to provide an improved method and apparatus for providing simultaneous communications between a plurality of transmitter-receiver pairs on a single carrier frequency.

Another object is to provide a communication system wherein communicated information is contained in pulses spaced randomly in time, each pulse being modulated with address information throughout the entire duration of the pulse and command information throughout a major portion of the pulse duration beginning after initiation of the pulse.

Another object is to provide a radio receiving station for operating remotely controlled equipment in accordance with received command signals following receipt of proper address signals.

Another object is to provide a radio transmitting station for operating remotely controlled equipment in accordance with transmitted command signals wherein initiation of a command transmission is momentarily delayed following initiation of an address transmission.

The invention broadly contemplates a radio communication system having means for randomly keying a transmitter to radiate bursts of modulated carrier signals to receivers within range of the transmitter and tuned to the transmitter carrier frequency. Means are also provided to modulate the carrier signal throughout each entire keying duration with a plurality of frequencies representing an address code and to modulate the carrier signal with frequencies representing a command code throughout a latter portion of each keying duration. Each receiver is coupled to an AND gate which permits control, by the command signals, of apparatus coupled to the output of the receiver only if the AND gate has first been energized as the result of receiving proper address frequencies.

The foregoing and other objects and advantages of the invention will become apparent from the following detailed description when read in conjunction with the accompanying drawings, in which.

Figure 1:
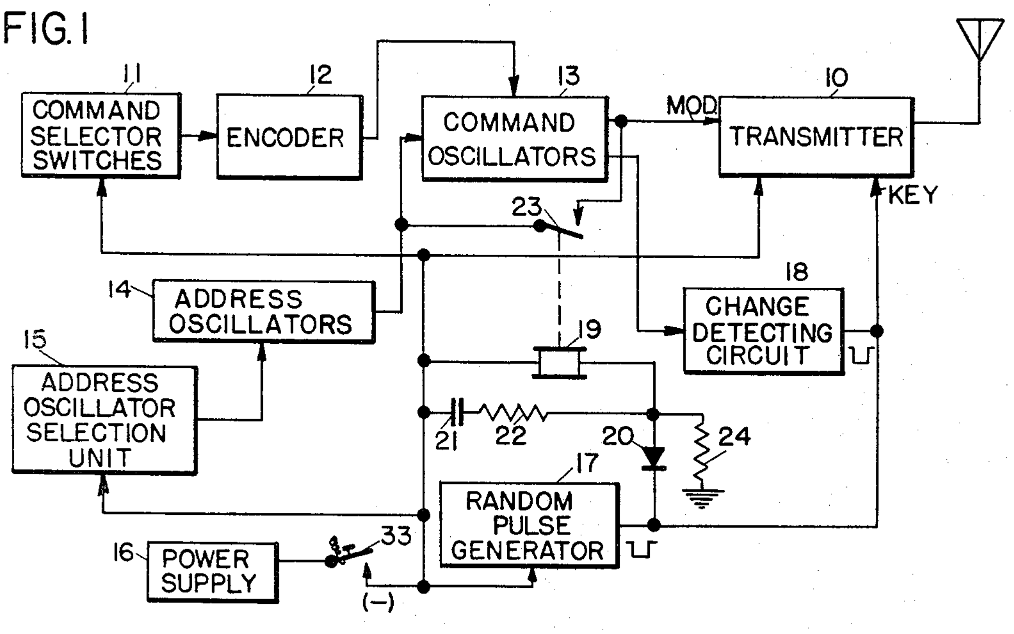
FIG. 1 is a functional block diagram of a transmitting station constructed in accordance with the invention.

Referring first to the functional block diagram of the transmitting station of FIG. 1, there is shown a transmitter 10, preferably of the frequency modulated type, receiving modulating signals from a series circuit comprising a group of command oscillators 13 and a group of address oscillators 14. Selection of a predetermined address modulation signal for carrying proper address information in the transmitter output signal is achieved by constant energization of predetermined oscillators in the group of address oscillators 14 through an address oscillator selection unit 15. This selection unit may include a coded plug for supplying power from a power supply 16 to only the preselected address oscillators.

Selection of a predetermined command modulation signal for the transmitter is achieved by selective triggering of predetermined command oscillators from an encoder 12, which in turn is controlled from a plurality of command selector switches 11.

A random pulse generator 17 is coupled to transmitter 10 for keying the transmitter each time a pulse is produced by the generator. The pulses produced by the generator, in the present embodiment, are negative pulses. Moreover, these pulses are random pulses; that is, the pulses recur at a randomly varying repetition rate. This pulse repetition rate, however, varies only with specified rate limits.

A relay 19 preferably of the reed switch type, and a diode 20 are connected in series across the random pulse generator. In addition, a series-connected capacitor 21 and resistor 22 are shunted across relay 19. A resistor 24 is coupled between the anode of diode 20 and ground, and maintains the anode at substantially ground potential. A front contact 23 of relay 19 is connected in shunt across command oscillators 13, so as to short-circuit the output of the command oscillators supplied to the transmitter, whenever front contact 23 is closed. The series resistor-capacitor circuit shunted across relay 19 provides delayed deenergization of the relay in a manner well known in the art.

A change detecting circuit 18 receives output from command oscillators 13 and provides a single keying pulse for transmitter 10 whenever a new sequence of command oscillators is triggered by encoder 12. Thus, although the transmitter is keyed by pulses having a varying pulse repetition rate, its is also keyed by an additional pulse produced immediately when a new sequence of command oscillators begins oscillating and relay 19 deenergizes. The pulses produced by change detecting circuit 18 in the present embodiment, are negative pulses. The change detecting circuit is described in greater detail in the aforementioned Hughson et al. application.

A switch 33 is interposed between power supply 16 and energization circuits coupled to command oscillator switches 11, random pulse generator 17, transmitter 10, address oscillator selection unit 15, and relay 19 together with its associated parallel-connected circuitry. Switch 33 can be made to function as a "dead-man switch"; that is, the switch may be spring loaded to open, so that if the operator for any reason releases his grip on the switch, no signals are produced from the transmitting station. This condition can be interpreted by the receiving equipment to supply a stop command to the controlled apparatus. Moreover, such switch serves to conserve power supply energy when the operator leaves his equipment.

When the transmitting station is operated as a man-carried unit, designed to be worn by the operator and thereby moved only in a substantially horizontal plane, switch 33 may be a mercury switch which opens when the equipment is tilted at an angle greater than a specified amount from the horizontal plane. Such switch also provides "dead-man" protection.

Power supply 16 comprises a battery pack when the transmitting station is utilized in man-carried operations. However, the transmitting station can easily be adapted to operate from any fixed or mobile power supply, whether it be alternating or direct current.

For transmitting station operation, preselected oscillators of the address and command oscillator groups are turned on, assuming switch 33 is closed. The address oscillators are selected by means of address oscillator selection unit 15 which applies steady energization to the preselected address oscillators. The command oscillators are selected by operation of the proper switch in the group of command selector switches 11. Operation of a command selector switch applies a voltage to encoder 12, the output of which energizes command oscillators 13 in accordance with the desired command.

Output from address oscillator group 14 is constantly applied to the input of transmitter 10 for the purpose of modulating the transmitter carrier frequency with the frequencies produced by this group of oscillators. However, relay 19 remains energized as long as no output pulse is produced by either random pulse generator 17 or change detecting circuit 18, short-circuiting the entire group of command oscillators 13 through front contact 23.

Each time a pulse is produced by pulse generator 17, transmitter 10 is keyed, producing an output pulse containing the transmitter carrier frequency and the modulation provided by the address ocillators. Moreover, each time a new command is selected, change detecting circuit 18 senses the change and keys the transmitter immediately, permitting rapid response to the new command by the receiving equipment. Whenever an output pulse is provided by either random pulse generator 17 or change detecting circuit 18, relay 19 is deenergized after a predetermined time delay, opening front contact 23 to permit modulation of the transmitter carrier frequency with the command oscillator frequencies. The series circuit comprising capacitor 21 and resistor 22 connected in shunt with relay 19 provides the predetermined time delay following initiation of an output pulse by either pulse generator 17 or change detecting circuit 18, thereby retaining the short-circuit across command oscillators 13 for this predetermined time. Thus, although each output pulse produced by the transmitter contains both address and command oscillator frequencies, the command frequencies do not appear until a predetermined time after initiation of the transmitter output pulse. Upon completion of the output pulse produced by either random pulse generator 17 or change detecting circuit 18, relay 19 is again energized, once again short-circuiting the oscillators in command oscillator group 13.

Nonconduction through diode 20 causes energization of relay 19. This occurs when no output pulses are produced by random pulse generator 17 and change detecting circuit 18. However, when either pulse generator 17 or change detecting circuit 18 produces a negative output pulse, diode 20 becomes conductive, introducing substantially zero voltage across the series circuit comprising capacitor 21 and resistor 22. Capacitor 21 thus commences to discharge, and after a time delay depending upon the rate of discharge, relay 19 deenergizes. Hence, when this negative keying pulse occurs, a predetermined length of time is required before relay 19 deenergizes to permit modulation of the transmitter with command frequencies. The command modulation is thus briefly delayed.

Operation of a command selector switch applies a new command code to command oscillators 13, producing a new modulating signal for the transmitter. Moreover, the change in command is sensed by change detecting circuit 18, causing the transmitter to be immediately keyed. Again, the transmitter is modulated throughout the entire keying duration with the address frequencies, and throughout a latter portion of the keying duration with the command frequencies.

Figures 2, 3:
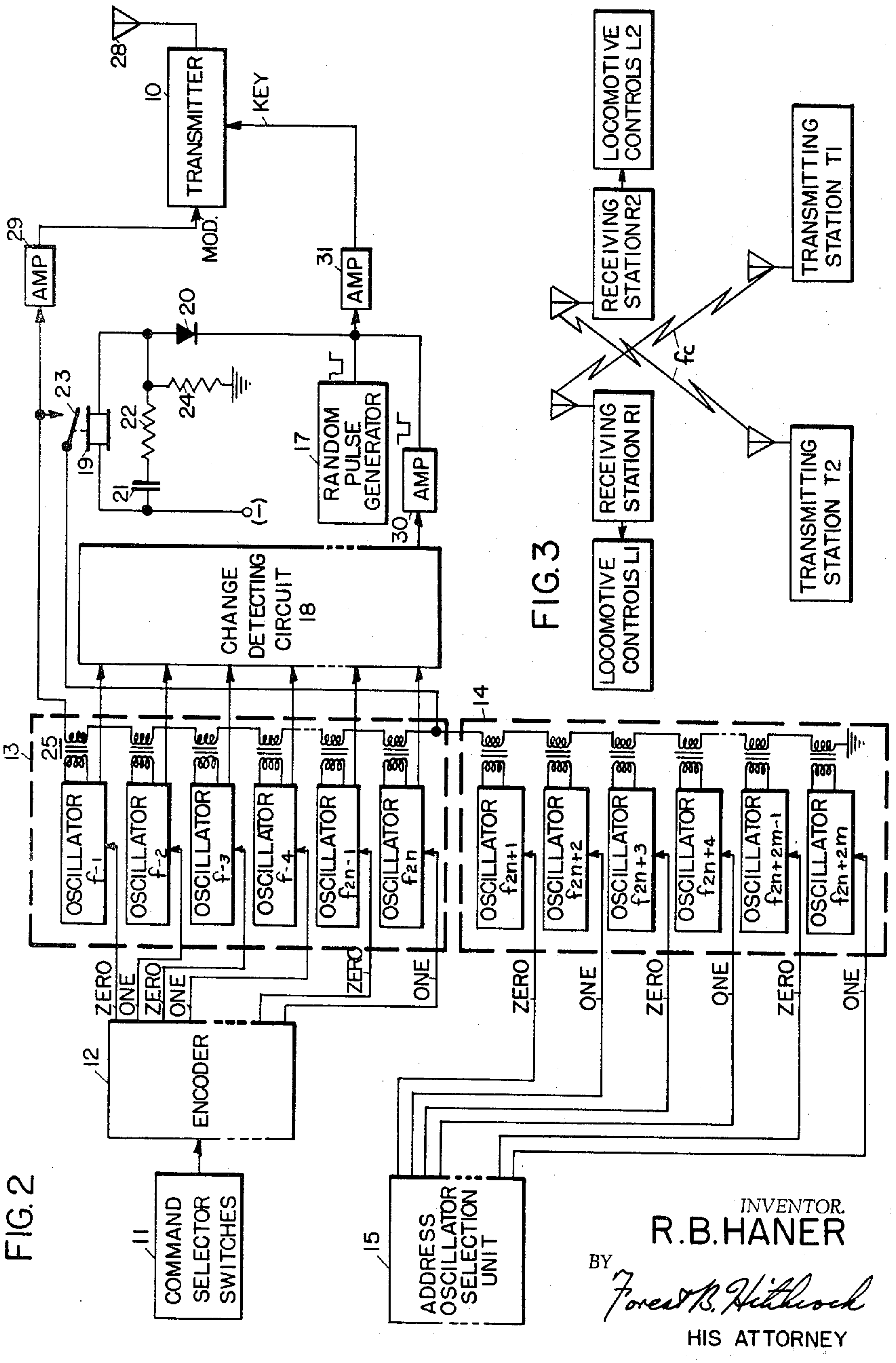
FIG. 2 is a part schematic and part block diagram of the transmitting station constructed in accordance with the invention.
FIG. 3 is a network block diagram showing how two locomotives can be remotely controlled separately over a single common carrier frequency.

Referring next to FIG. 2 for a more detailed description of the transmitting station, less the power supply circuitry, encoder 12 is shown producing a binary code for triggering a fixed number of predetermined oscillators in command oscillator group 13 as determined by operation of a command selector switch in the group of command selector switches 11. Operation of a command selector switch applies a voltage to encoder 12, which then produces operation of command oscillators 13 in accordance with the desired command. Each oscillator in the command oscillator group produces a predetermined frequency $f_1$–$f_{2n}$, where *n* represents the number of pairs of oscillators in the command oscillator group and consequently the number of bits in the command word.

Each output conductor from encoder 12 is designated as a binary ZERO or ONE. The ZERO conductors are connected so as to trigger certain oscillators in the command oscillator group, while the ONE conductors are connected to trigger the remaining oscillators in the command oscillator group. Each conductor is coupled to but one oscillator, and triggers that oscillator upon energization.

The group of address oscillators 14 comprises oscillators oscillating at frequencies $f_{2n+1}$–$f_{2n+m}$, where *m* represents the number of pairs of oscillators in the address oscillator group and consequently the number of bits in the address word. Address oscillator selection unit 15 supplies power to selected oscillators in the address oscillator group for maintaining them in constant oscillation.

Outputs of every oscillator in command oscillator group 13 and address oscillator group 14 are coupled together through respective output transformers such as transformer 25 associated with the oscillator generating frequency $f_1$ so as to provide a composite output signal for application to the transmitter. These transformer-coupled outputs are shown connected in series; however, they can be connected in parallel instead, according to the dictates of choice.

The composite output of the aforementioned oscillators is coupled to an amplifier 29, the output of which supplies modulation for transmitter 10. In this fashion, transmitter 10 is modulated by both the command oscillator group and the address oscillator group.

A second output is taken from each oscillator in the command oscillator group and applied through change detecting circuit 18 to the input of an amplifier 30. The output of amplifier 30 is coupled to the input of an amplifier 31, the output of which keys the final stages of the transmitter in order to provide an output pulse therefrom.

Output of random pulse generator 17 is also coupled to the input of amplifier 31, and provides pulses which recur periodically within certain preselected time limits, but at random times within these limits. Although many techniques for producing random pulses are available, one technique which works very well with this system is to utilize a pair of free-running multivibrators operating at almost identical frequencies. The multivibrator outputs are coupled together so as to apply a combined signal to the input of amplifier 31 each time both multivibrators produce output pulses simultaneously. The combined signal can thus be seen to have a varying pulse repetition rate.

Front contact 23 of relay 19 is connected in shunt across command oscillators 13, so as to short-circuit the output of the command oscillators whenever the front contact is closed. The series resistor-capacitor circuit shunted across relay 19 provides delayed deenergization of the relay upon production of an output pulse by either the random pulse generator or the change detecting circuit.

The combined frequencies produced by the energized oscillators in the address oscillator group are continuously applied to transmitter 10 through front contact 23 of relay 19 when the relay is energized, and in series with the output transformers of command oscillators 13 when front contact 23 is open. Thus, transmitter 10 is continuously modulated by the address frequencies.

Each time a command selector switch is operated, an output code is produced by encoder 12 which energizes preselected oscillators in command oscillator group 13 accordingly. During intervals in which no command switch is operated, a predetermined group of oscillators in the command oscillator group is energized. When front contact 23 is closed, the frequencies produced by the energized oscillators of command oscillator group 13 are short-circuited. However, when front contact 23 is open, the frequencies produced by the energized oscillators of command oscillator group 13 are combined with those frequencies produced by address oscillator group 14, and the resulting composite signal comprises modulation for transmitter 10 through amplifier 29.

Upon operation of a command selector switch, those oscillators of command oscillator group 13 which are thereby energized provide a pulse through change detecting circuit 18, which is supplied through amplifiers 30 and 31 to key the output stages of the transmitter. The modulated carrier frequency produced by the transmitter is thus radiated from antenna 28. Consequently, upon initiation of a command, a transmitter output signal is immediately radiated, whether or not random pulse generator 17 has produced an output pulse at the instant the command selection is made.

After the command selection has been made, and the first pulse from transmitter 10 has been initiated by change detecting circuit 18, subsequent keying pulses are supplied to transmitter 10 through amplifier 31 from random pulse generator 17. In this fashion, each output pulse produced by transmitter 10 contains a steady-state command signal and a preselected address signal. The command signal remains unchanged, until a new command is initiated by command selector switches 11. However, whenever an output pulse is provided by either random pulse generator 17 or change detecting circuit 18, relay 19 deenergizes after a brief delay, opening front contact 23 to permit modulation of the transmitter carrier frequency with the command oscillator frequencies. Thus, command modulation is added to the output pulse of the transmitter only after a predetermined time delay following initiation of an output pulse by either pulse generator 17 or change detecting circuit 18. The short-circuit is retained across command oscillators 13 during this predetermined time delay. Therefore, although each output pulse produced by the transmitter contains both address and command modulating frequencies, the command frequencies do not appear until a predetermined time after initiation of the transmitter output pulse. Upon completion of the output pulse produced by either random pulse generator 17 or change detector circuit 18, relay 19 is again energized, and the oscillators in command oscillator group 13 are once again short-circuited.

FIG. 3 is an illustration of netwrk operation wherein two locomotives are controlled individually from separate transmitting stations over the same carrier frequency $f_c$. Thus, a first transmitting station T1 communicates information to a first receiving station R1 which then couples an output code in accordance with the received signal to a first set of locomotive controls L1 for controlling a first locomotive in accordance with the coded information transmitted from station T1. Contemporaneously, a second transmitting station T2 operates over the same carrier frequency $f_c$, and communicates information to a second receiving station R2 which then couples an output code in accordance with the received signal to a second set of locomotive controls L2 for controlling the second locomotive in accordance with the coded information transmitted from station T2. Under these circumstances, the possibility of interference arises. Because the system is designed so that interference is not recognized as such by the controlled apparatus unless two consecutive pulses produced from the two transmitting stations occur simultaneously, the chance of interference is extremely slight. This is due to the low probability that two consecutive pulses produced from the two transmitting stations will occur simultaneously. The receiver thus requires two consecutive periods of simultaneous pulse transmission, before interference is recognized. When such interference does occur, the locomotive controls are designed to produce a brake application. A separate command selector switch must then be operated in order to restart the locomotive. In this manner, fail-safe operation is achieved.

Figure 4:
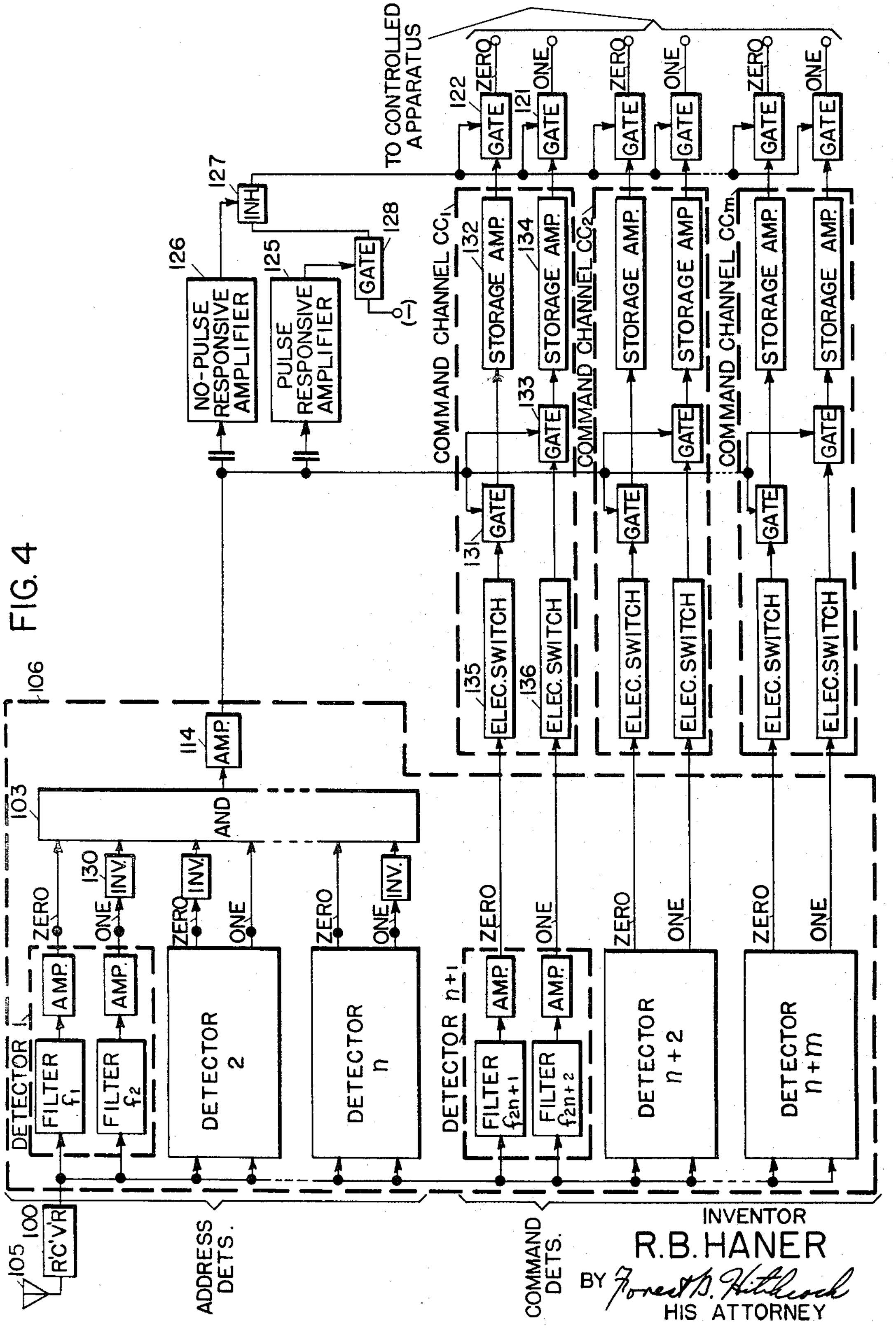
FIG. 4 is a part schematic and part block diagram of a receiving station constructed in accordance with the invention.

Turning next to FIG. 4, a fail-safe system for reception and classification of the signal produced by the transmitting system of FIG. 2, prior to application to the controlled equipment, is shown. Receiver 100 receives the signal radiated from the transmitting system of FIG. 1 at its antenna 105 and demodulates the signal. The modulating frequencies are then supplied from the output of receiver 100 to a switching circuit 106 which comprises a plurality of detectors coupled in parallel. A first group of these detectors, detectors 1–$n$, provides outputs to AND gate 103. These detectors are responsive to presence of the address code in the received signal, and are designated address detectors. A second group of these detectors, detectors $n+1$—$n+m$, are responsive to presence of the command code in the received signal, and are designated command detectors. Each command code indication is coupled to a command channel, described infra.

Each address detector comprises a pair of band pass filters, the output of each filter being coupled to a separate amplifier. Thus, for example, detector 1 produces an output when either frequency $f_1$ or $f_2$ is present in the output signal of receiver 100. Output from filter $f_1$ represents a binary ZERO, while output from filter $f_2$ represents a binary ONE. The output of every address detector filter is individually amplified and applied to AND gate 103 either directly or through an inverter. In this manner, the address code is applied to the AND gate, which is thereby rendered responsive not only to presence of proper address frequencies, but also to absence of improper address frequencies. This is accomplished by use of inverters, such as inverter 130 coupling the ONE output of detector 1 to AND gate 103. Inverter 130 provides an output signal only when no input signal is applied thereto. Thus, detector 1 must provide a ZERO output, and also not provide a ONE output, in order to supply its full complement of output signals to AND gate 103.

In fashion similar to that of the address detectors, each command detector also comprises a pair of band pass filters. Each output bit produced by each command detector is coupled through an associated electronic switch and a gate to the input of a storage amplifier. Thus, the ZERO output of detector $n+1$ is coupled through an electronic switch 135 to a gate circuit 131 and thence to a storage amplifier 132. Similarly, the ONE output of detector $n+1$ is coupled through an electronic switch 136 to a gate circuit 133 and thence to the input of a storage amplifier 134. Electronic switch 135, gate 131 and storage amplifier 132 comprise one-half of a command channel $CC_1$, while electronic switch 136, gate 132 and storage amplifier 134 comprise the other half of this command channel. In similar fashion, the ZERO and ONE outputs of detector $n+2$ are supplied to the inputs of a command channel $CC_2$, and the ZERO and ONE outputs of detector $n+m$ are supplied to the inputs of a command channel $CC_m$. Therefore, the receiving station is capable of responding to an address word comprising $n$ discrete bits of information, and a command word comprising $m$ discrete bits of information. This is the same number of bits transmitted in the address and command words produced by the transmitting system of FIG. 2. Output of AND gate 103 is amplified by amplifier 114 and comprises the output of switching circuit 106.

Each of the outputs of each command channel is applied to a respective final gate. For example, binary ZERO information is supplied from storage amplifier 132 of command channel $CC_1$ to the input of a gate 122, while binary ONE bits are supplied from storage amplifier 134 of command channel $CC_2$ to the input of a gate 121.

It should be noted that in the event an erroneous address is received by receiver 100, less than all inputs to AND gate 103 are fulfilled. This renders the gates in the command channels, such as gates 131 and 133 in command channel $CC_1$, nonconductive, preventing the command signal associated with an erroneous address signal from reaching the controlled apparatus. However, it should also be noted that if gates 131 and 133 are conductive and the output signal produced by AND gate 103 suddenly ceases, a finite time, however small, is required for gates 131 and 133 to effectively open-circuit the inputs to storage amplifiers 132 and 134 respectively. This condition would create difficulties in operation, but for the delay in receipt of command modulation, as described, infra.

Each storage amplifier used in the command channels incorporates therein a predetermined delay, thereby continuing to produce an output signal for a predetermined time after an input signal applied thereto has been removed. This delay may be on the order of 3.0 seconds, so as to assure that absence of but one command pulse will not produce deenergization of the controlled apparatus. A delay greater than the predetermined delay, however, removes the storage amplifier output signals.

Each electronic switch provides one of two output polarities, depending upon whether or not input energization is supplied thereto. For example, as long as an input is supplied to electronic switch 135 from command detector $n+1$, each time gate circuit 131 is rendered conductive, a new bit is stored in storage amplifier 132, and output voltage therefrom is continuously maintained. However, in the event the output of detector $n+1$ changes from a ZERO to a ONE, the polarity of output voltage produced by electronic switch 135 reverses, and the bit formerly stored in storage amplifier 132 is abruptly removed. Consequently, storage amplifier 132 ceases producing an output voltage, while storage amplifier 134 initiates a new output voltage in response to the change in polarity of output voltage produced by electronic switch 136.

Control of the final gates, such as gates 121 and 122, is maintained by existence of output pulses from amplifier 114. A pulse responsive amplifier 125 and a no-pulse responsive amplifier 126 are capacitively coupled to the output of amplifier 114. Output of no-pulse responsive amplifier 126 provides a first, or control signal, to an INHIBIT gate 127, while output from pulse responsive amplifier 125 provides a gating signal for a gate circuit 128. Gate circuit 128 and INHIBIT gate 127 provides a series circuit from the negative side of the receiving station direct current power supply to gating inputs of the final gates, such as gates 121 and 122, to provide control signals for the final gates.

As long as pulses are produced from amplifier 114, indicating that receiver 100 is receiving pulses, gate circuit 128 is maintained conductive by receipt of a gating signal from amplifier 125. The signal applied to gate circuit 128 from amplifier 125 may be in the form of a pulse train if, for example, the output of the amplifier is applied directly to the coil of a relay having a front contact which maintains a complete circuit between the negative side of the receiving station direct current power supply and a second, or operating signal input, of INHIBIT gate 127. On the other hand, amplifier 125 may integrate the received pulses, and use the integrated output signal to control gate circuit 128.

Similarly, no-pulse responsive amplifier 126 produces an output signal only when no pulse train is applied to its input. This occurs both when no output is applied from amplifier 114, as well as when a steady direct current is provided from amplifier 114. Therefore, as long as pulses are received by amplifier 126, no control signal is applied to INHIBIT gate 127 from amplifier 126, and the INHIBIT gate thus remains conductive.

Output of INHIBIT gate 127 provides a gating signal for the final gates, such as gates 121 and 122. Thus, if amplifiers 125 and 126 both receive pulses, a gating signal is applied to the final gates. For example, when amplifier 114 provides output pulses, gates 121 and 122 receive gating signals from INHIBIT gate 127, thereby becoming conductive. Then depending upon whether electronic switch 132 or 134 provides an output signal, a binary ZERO or ONE respectively is produced at the output of the receiving station. Hence, it is obvious that checks are provided in the system to assure that before a command signal reaches the controlled apparatus, pulses are continuously received from receiver 100, indicating that the operator is remaining at his transmitting station.

In operation, each time a pulse containing address and command modulating frequencies is received at receiver 100, and assuming that the proper address is received by the receiver, AND gate 103 provides an output signal to amplifiers 125 and 126, as well as to the gate circuits in the command channels. Each command bit is then passed from the electronic switch through the gate circuit in the respective command channel responsive thereto to its associated storage amplifier. In this fashion, either a ONE or ZERO is produced at the output of the command channel. For example, if a binary ONE is produced at the output of detector $n+1$, an output signal is provided from storage amplifier 134 to the input of gate 121. A second or gating input is applied to gate 121 from INHIBIT circuit 127 in series with gate circuit 128 when amplifier 125 produces an output and amplifier 126 produces no output. Thus, depending upon which of gates 121 and 122 are energized from a storage amplifier 134 and 132 respectively, either a ONE is produced at the output of gate 121 or a ZERO is produced at the output of gate 122, respectively.

If amplifier 125 should cease producing an output signal or if amplifier 126 should commence producing an output signal, either of which condition indicates a probability that pulses are no longer being coupled through amplifier 114 from receiver 100, gating voltage is removed from gates 121 and 122, and all other final gates. This condition then prevents output from command channel $CC_1$ as well as from command channels $CC_2$–$CC_m$ from reaching the controlled apparatus, which is interpreted by the controlled apparatus to produce a stop command.

Figure 5:
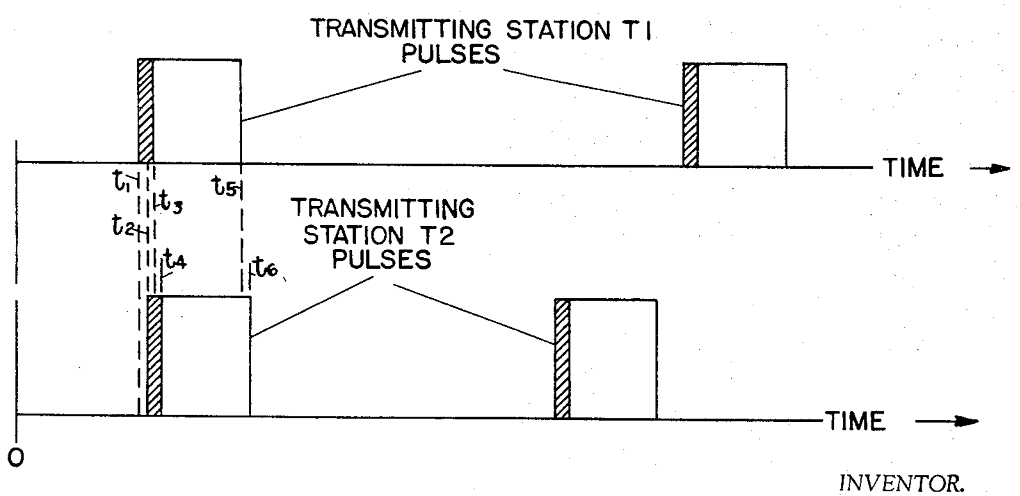
FIG. 5 is a graphical illustration of time spacing of consecutive pulses produced by the transmitting stations of FIG. 3.

FIG. 5 is a graphical illustration of a condition which may arise when at least two transmitting stations and two receiving stations are working within an area wherein communications from either transmitting station are received by the receivers at both receiving stations. Assume that receiving station R1 is intended to receive communications only from transmitting station T1 and receiving station R2 is intended to receive communications only from transmitting station T2, as illustrated in FIG. 3. However, both transmitters and receivers are operating on a common frequency $f_c$, and hence concurrent pulses, even though occurring rarely, must be prevented from interfering with proper communications.

Assume that the crosshatched portions of the pulses in FIG. 5 contain only address information, while the clear portions contain both address and command information. Assume, therefore, that at time $t_1$, transmitting station T1 initiates an output pulse which contains command modulation starting at time $t_3$ and ending at time $t_5$. Assume also that at time $t_2$, transmitting station T2 initiates an output pulse which contains command modulation starting at time $t_4$ and ending at time $t_6$.

During the interval from $t_1$ to $t_2$, receiving station R1 receives a proper address signal, and responds by energizing its command channel gate circuits. At time $t_2$, additional address frequencies are received at receiving station R1, and the AND gate at receiving station R1 deenergizes the command channel gate circuits. However, as previously noted, a finite time is required for the command channel gates to switch to their nonconductive conditions. This time delay is not only inherent in the gates, whether they be electronic circuits or relays, but also in the circuitry operating the gates. During this finite time delay, if the transmitted pulses from transmitting station T2 contained command information at time $t_2$, erroneous commands would be passed through the command channel gates of receiving station R1 during the brief instant extending from time $t_2$ to the instant at which the gates actually became nonconductive. Such situation would obviously be undesirable. Therefore, by delaying the onset of command information in the transmitted pulses produced by station T2 until time $t_4$, pulses produced by transmitting station T2 coincidentally with pulses produced by transmitting station T1 cannot provide erroneous commands at receiving station R1, since the interval extending from time $t_2$ to $t_4$ is made larger than the interval extending from the instant a received address abruptly becomes erroneous to the instant at which the command channel gates become nonconductive in response to the erroneous address. Therefore, receiving station R1 receives no command signals, even though it had previously received a proper address signal. At receiving station R2, the received address is erroneous from the outset, and therefore no commands are received by the controlled apparatus at receiving station R2, unless the interval extending from time $t_5$ to $t_6$ is of sufficient duration to permit the command channel gates at receiving station R2 to be rendered conductive. However, the next successive pulse produced by each transmitter will rarely coincide, and hence operations can continue uninterrupted.

It should also be noted that if the first pulse produced by transmitting station T2 were initiated subsequent to time $t_3$, but prior to time $t_5$, it is conceivable that proper commands would actually be received at both stations R1 and R2 within the interval extending from time $t_3$ to time $t_6$.

In the event a pulse from transmitting station T1 coincides with a pulse produced by transmitting station T2, as illustrated in FIG. 5, and the command channel gates prevent the command signal from being applied to the electronic switches in the command channels, those electronic switches previously provided output energy as a result of previously-received command information continue to produce an output for the maximum possible time which may elapse between the first and last of any three consecutive pulses. This is accomplished by a built-in delay in the storage amplifier, lasting for the aforementioned time, which is on the order of 3.0 seconds. After this delay has elapsed, the output of each of the previously-conducting electronic switches falls to zero. If a new command has not been received prior to this time, neither a ONE nor ZERO is produced by the command channels, and the controlled apparatus is thereby deenergized. In the case of a locomotive, a brake application is produced. It should be noted, however, that the delay in the electronic switch is adjustable, and the output provided therefrom may be held for any desired length of time, so that omission of two, three or more pulses may be established as a criterion for removal of command signals from the controlled apparatus. Alternatively, the electronic switches may be designed to indefinitely continue to produce an output, as long as no new command is produced. This would achieve continuity of operations, at the expense of fail-safety.

Figure 6:
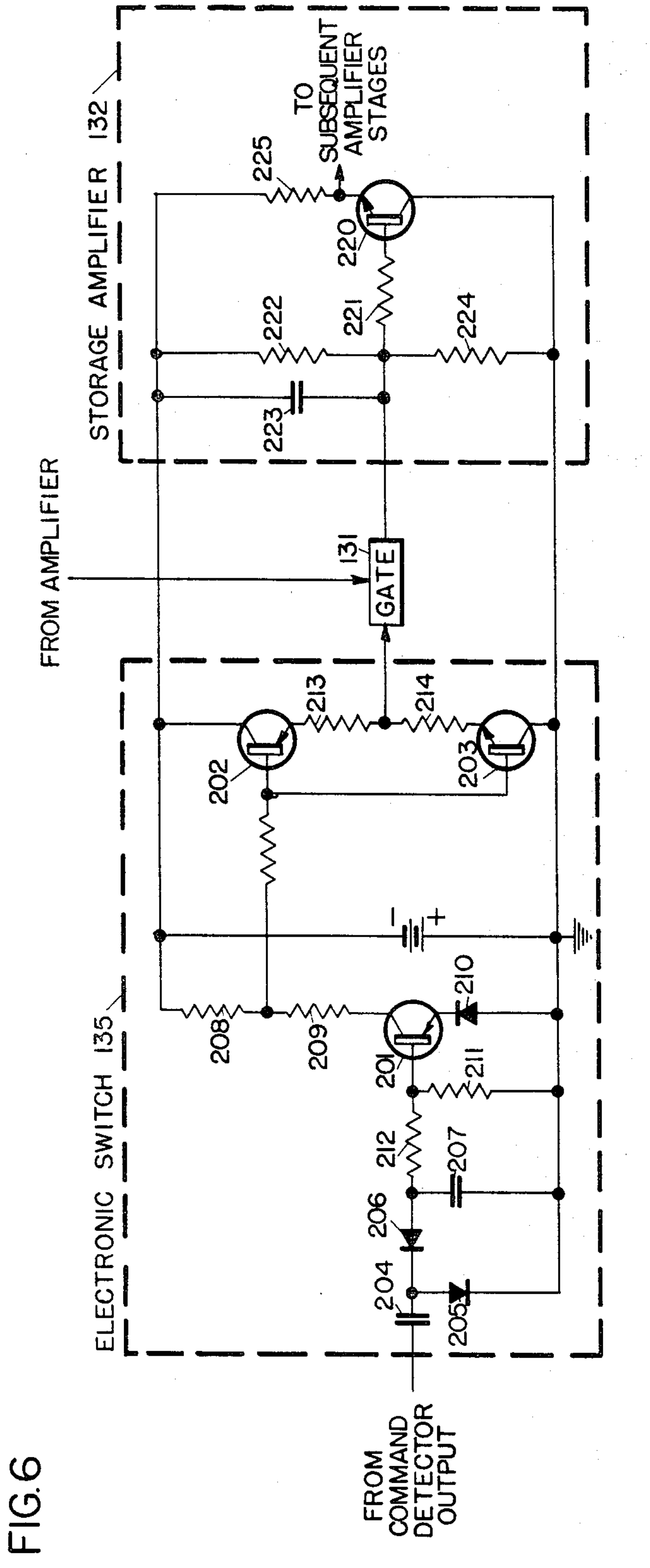
FIG. 6 is a schematic diagram of a portion of a command channel in the receiving station.

FIG. 6 is a circuit diagram of a portion of command channel $CC_1$ in the receiving system of FIG. 4, for the purpose of illustrating the circuit configuration of electronic switch 135 and the input stage of storage amplifier 132. Electronic switch 135 comprises an input transistor 201 and a pair of output transistors 202 and 203. It should be noted that transistors 202 and 203 are complementary; that is, transistor 202 is of the PNP type, while transistor 203 is of the NPN type.

When a ZERO is produced by command detector $n+1$ of the receiving system, the corresponding modulating frequency is coupled through a capacitor 204 to the anode of a first diode 205 and the cathode of a second diode 206. The cathode of diode 205 is grounded. A capacitor 207 is connected between the anode of diode 206 and ground, and comprises a pulse stretcher for briefly extending the duration of each pulse applied to the base of transistor 201. The positive side of the power supply is grounded.

Negative bias is supplied to the collector of transistor 201 through a pair of series-connected resistors 208 and 209. A slight emitter bias is supplied through a diode 210 having a grounded anode. Base bias for transistor 201 is provided through a resistor 211 which is grounded at one end, while input signals to the transistor are supplied through a coupling resistor 212.

Input signals are resistively coupled from the point common to resistors 208 and 209 to the parallel-connected bases of transistors 202 and 203. Negative bias is supplied to the collector of transistor 202, while the collector of transistor 203 is grounded. The emitter of transistor 202 is coupled to the input of gate circuit 131 through a resistor 213, while the emitter of transistor 203 is also coupled to the input of gate circuit 131 through a resistor 214.

Output signals from gate 131 are supplied to a transistor 220 through a base coupling resistor 221. A resistor 222 and a storage capacitor 223 are connected in parallel from the negative side of the power supply to the output of gate 131. A biasing resistor 224 is connected between the output of gate circuit 131 and ground. The collector of transistor 220 is grounded, while emitter bias is supplied to transistor 220 through a resistor 225. Output from the emitter of transistor 220 is supplied to subsequent amplifier stages of storage amplifier 132.

Assume now that a ZERO is provided from command detector $n+1$. This bit is supplied in the form of a pulse consisting of frequency $f_{2n+1}$. Capacitor 207 thus acquires a negative voltage of amplitude almost double the maximum amplitude of the command detector output voltage, since diode 205 conducts on positive voltage swings to charge capacitor 204 in a direction tending to drive the base of transistor 201 negative, while diode 206 conducts on negative voltage swings to charge capacitor 207 with the command detector output voltage plus the D.C. voltage stored on capacitor 204. The negative voltage acquired by capacitor 207 renders transistor 201 conductive, and a voltage drop therefore appears across resistor 208 of polarity to render transistor 202 nonconductive and transistor 203 conductive. Because a transmitted pulse is in the process of being received, gate 131 is conductive. Hence, the base of transistor 220 is driven positive, rendering the transistor conductive. Simultaneously, capacitor 223 acquires a charge which tends to bias the base of transistor 220 in a positive direction, maintaining the transistor conductive. A positive output voltage is thus tranferred to the subsequent stages of storage amplifier 132, and a ZERO output is provided by command channel $CC_1$.

Upon completion of the received pulse, the RC time constant of capacitor 207 and resistors 211 and 212 in series permits the charge on capacitor 207 to decay gradually to a value which drives the base of transistor 201 positive with respect to the emitter. This renders transistor 201 nonconductive, and removes the voltage drop across resistor 208. Hence, the bases of transistors 202 and 203 are driven negative, rendering transistor 202 conductive and transistor 203 nonconductive. This causes application of a negative voltage to the input of gate 131. However, due to completion of the received pulse prior to the delayed switching of transistor 201 to a nonconductive condition, gate 131 becomes nonconductive prior to application of this negative voltage to the gate, isolating the negative voltage from the output of the gate. This insures that the negative output voltage from electronic switch 135 cannot cause a rapid discharge of capacitor 223 as long as the command code remains unchanged.

The RC time constant of capacitor 223 and resistor 222 is such that the voltage on capacitor 223 decays to a value sufficiently low to render transistor 220 nonconductive and thereby remove the ZERO output from command channel $CC_1$ in the event no further signal is supplied from gate 131 within the maximum time which could be required in order to receive two consecutive pulses from the transmitting station. Therefore, the command signal can be seen to persist at the output of the command channel for approximately 3.0 seconds. Beyond that time, however, the command signal is removed. Nevertheless, this persistence time may be adjusted to another value, if desired, by altering the values of resistor 222 or capacitor 223 or both.

Assuming the next successive pulse is received, and the pulse still requires a ZERO from command channel $CC_1$, gate 131 again applies a positive voltage to the base of transistor 220, and capacitor 223 is again charged to its maximum value. However, if on this next successive pulse a ONE is required at the output of command channel $CC_1$, a negative voltage is supplied to the input of conductive gate 131, as previously explained. This negative voltage then produces rapid discharge of capacitor 223 through resistor 213 and transistor 202 in series. As a result, transistor 220 is abruptly cut of, and the ZERO output from command channel $CC_1$ abruptly ceases. The One portion of command channel $CC_1$ simultaneously initiates an output signal, and the command signals are thereby changed at the output of the command channel.

Thus there has been described a system for accommodating a large plurality of communicated messages on a single frequency without interference between simultaneously transmitted messages. The system utilizes pulses produced at random repetition rates at each transmitting station to carry information. Each transmitter is on the air for merely a fraction of each period, or time interval, between the start of two consecutive pulses, leaving the remaining time in each period for other transmissions to occur from other transmitters without interference from the first transmitter. Each pulse is modulated with both command and address frequencies, the command frequencies being delayed in order to provide sufficient time for the receiving station to actuate a gate and thereby block receipt of improper command frequencies originating from a spurious transmitting station after proper address frequencies have been received from the legitimate transmitting station.

Although but one embodiment of the present invention has been described, it is to be specifically understood that this form is selected to facilitate in disclosure of the invention rather than to limit the number of forms which it may assume; various modifications and adaptations may be applied to the specific form shown to meet requirements of practice, without in any manner departing from the spirit or scope of the invention.

What is claimed is:

1. A communication system comprising, means for generating pulses recurring at random times within periods of predetermined maximum and minimum limits, a transmitter sending a carrier frequency, means keying said transmitter with the output of said generating means, means for producing a selected group of address frequencies and modulating the carrier frequency with the group of address frequencies throughout the entire keying duration, means for producing a group of command frequencies and modulating the transmitter with the group of command frequencies beginning after said transmitter is initially keyed and continuing for the remainder of said keying duration, receiving means responsive to the output of said transmitter including demodulating means providing a composite signal containing the address and command frequencies, first means coupled to said demodulator means for recovering the selected group of address frequencies from the composite signal, second means coupled to said demodulator means for recovering the group of command frequencies from the composite signal, utilization means, and circuit means responsive to said first means for only coupling said second means to said utilization means upon receipt of the selected group of address frequencies, the delay in transmission of the command frequencies preventing coupling of command frequencies until after receipt of the selected group of address frequencies.

2. The communication system of claim 1 wherein said circuit means includes temporary storage means maintaining a continuous output signal for a predetermined interval in response to said second means recovering the group of command frequencies.

3. In a system for establishing communications on a single carrier frequency; a plurality of transmitting stations, each transmitting station comprising a transmitter, first means selectively producing a first group of frequencies, second means selectively producing a second group of frequencies, means keying the transmitter randomly once within every one of consecutive periods varying in duration between maximum and minimum limits, means coupling said first named means to said transmitter for modulating said carrier frequency with said first group of frequencies throughout the entire keying duration of the transmitter, means coupling said second named means to said transmitter for modulating the carrier frequency with said second group of frequencies throughout a final fraction of the transmitter keying duration; and a plurality of receiving stations, each receiving station being responsive to signal transmitted from a different one of said plurality of transmitting stations and comprising receiving means responsive to the modulated carrier frequency for providing a composite output signal consisting of the modulating frequencies, first and second detector means separating the received modulating frequencies into said first and second groups of frequencies respectively, an AND circuit responsive to said first detector means for producing an output upon presence of a predetermined number and combination of modulating frequencies applied thereto, utilization means, and circuit means responsive to the output of said AND circuit for controllably coupling said second detector means to said utilization means.

4. The system for establishing communications on a common carrier frequency of claim 3 wherein each transmitting station includes additional means responsive to said second means and adapted to key said transmitter immediately upon a change in the frequencies comprising the second group of frequencies.

5. The system for establishing communications on a common carrier frequency of claim 3 wherein said circuit means includes temporary storage means producing a continuous output signal for a predetermined interval upon receipt of a signal from said second detector means.

6. In a system for establishing communications on a single carrier frequency; a plurality of transmitting stations, each transmitting station comprising a transmitter, first means selectively producing a first group of frequencies representative of a particular transmitter, second means selectively producing a second group of frequencies, means keying the transmitter with a unique pattern of recurring pulses, means coupling said first named means to said transmitter for modulating said carrier frequency with said first group of frequencies throughout the entire keying duration of the transmitter, means coupling said second named means to said transmitter for modulating the carrier frequency with said second group of frequencies throughout a final fraction of the transmitter keying duration; and a plurality of receiving station, each receiving station being responsive to a signal transmitted from a different one of said plurality of transmitting station and comprising receiving means responsive to the modulated carrier frequency for providing a composite output signal consisting of the modulating frequencies, first and second detector means separating the received modulating frequencies into said first and second group of frequencies respectively, an AND circuit responsive to said first detector means for producing an output upon presence of a predetermined number and combination of modulating frequencies representative of the particular transmitter applied thereto, utilization means responsive to the second group of frequencies, and circuit means responsive to the output of said AND circuit for controllably coupling said second detector means to said utilization means, the delay in transmission of the second group of frequencies preventing coupling of any second group of frequencies not associated with the first group of frequencies representative of the particular transmitter.

7. The system for establishing communications on a common carrier frequency of claim 6 wherein each transmitting station includes additional means responsive to said second means and adapted to key said transmitter immediately upon a change in the frequencies comprising the second group of frequencies.

8. The system for establishing communications on a common carrier frequency of claim 7 wherein said circuit means includes temporary storage means producing an output signal for a predetermined interval upon receipt of a signal from said second detector means.

9. Means for transmitting random bursts of frequency modulated carrier signal comprising a transmitter, first means selectively producing a first group of frequencies, second means selectively producing a second group of frequencies, means coupling said first and second means to the transmitter for modulating said transmitter with said first and second groups of frequencies, means repeatedly keying the transmitter at random once within every one of consecutive periods varying in duration between maximum and minimum limits, means responsive to said keying means for momentarily delaying application of said second group of frequencies to the transmitter upon initiation of each keying pulse, detection means responsive to said second means for detecting a change in composition of the second group of frequencies, said detection means being coupled to the transmitter for keying the transmitter immediately upon said change in composition, and means coupling said detection means to said means for momentarily delaying application of said group of frequencies to the transmitter.

10. In a radio communication system, a transmitter, random pulse generating means coupled to said transmitter for keying the transmitter to send a carrier frequency at a randomly varying repetition rate, first means generating an address signal coupled to said transmitter for modulating said carrier frequency immediately upon prodfuction of each keying pulse by said random pulse generating means, second means generating a command signal coupled to said transmitter and responsive to said random pulse generating means for modulating said carrier frequency after a delay following initiation of each keying pulse produced by said pulse generating means, and receiving station means responsive to signals produced by said transmitter, said receiving station means including a receiver, first detector means responsive to said receiver for detecting modulation produced by said first means, second detector means coupled to said receiver means for detecting modulation produced by second means, utilization means, and circuit means responsive to said first detector means and controllably only coupling said second detector means to said utilization means, the delay in transmission of the command signals preventing the coupling of command signals to the utilization means until after said address signals are detected.

11. The radio communication system of claim 10 wherein said circuit means includes temporary storage means producing a continuous output signal for a predetermined interval upon receipt of a signal from said second detector means.

References Cited

UNITED STATES PATENTS

| | | | |
|---|---|---|---|
| 3,128,349 | 4/1964 | Boesch et al. | 340—171 |
| 3,160,711 | 12/1964 | Schroeder | 325—55 |
| 3,239,761 | 3/1966 | Goode | 340—171 |
| 3,293,549 | 12/1966 | Patterson | 325—55 |

JOHN W. CALDWELL, *Primary Examiner.*

A. J. KASPER, *Assistant Examiner.*